United States Patent

Laconto, Sr. et al.

[11] Patent Number: 5,989,301
[45] Date of Patent: Nov. 23, 1999

[54] OPTICAL POLISHING FORMULATION

[75] Inventors: Ronald W. Laconto, Sr., Leicester; Rami Schlair, Newton, both of Mass.

[73] Assignee: Saint-Gobain Industrial Ceramics, Inc., Worcester, Mass.

[21] Appl. No.: 09/025,730

[22] Filed: Feb. 18, 1998

[51] Int. Cl.[6] .................................................. C09G 1/02
[52] U.S. Cl. ................................................. 51/309; 106/3
[58] Field of Search .................... 51/307, 309; 106/3; 252/79.1; 216/96, 97

[56] References Cited

U.S. PATENT DOCUMENTS

| | | |
|---|---|---|
| 3,429,080 | 2/1969 | Lachapelle ................................ 51/309 |
| 4,106,915 | 8/1978 | Kagawa et al. . |
| 4,576,612 | 3/1986 | Shukla et al. . |
| 4,601,755 | 7/1986 | Melard et al. ............................. 51/309 |
| 5,632,668 | 5/1997 | Lindholm et al. . |
| 5,693,239 | 12/1997 | Wang et al. . |
| 5,697,992 | 12/1997 | Ueda et al. ............................... 51/309 |
| 5,804,513 | 9/1998 | Sakatani et al. .......................... 51/309 |

FOREIGN PATENT DOCUMENTS

| | | |
|---|---|---|
| 608730 | 8/1994 | European Pat. Off. . |
| 10183104 | 12/1996 | Japan . |
| WO 97/43087 | 11/1997 | WIPO . |

*Primary Examiner*—Michael Marcheschi
*Attorney, Agent, or Firm*—David Bennett

[57] ABSTRACT

An optical polishing slurry with alumina and ceria components is found to produce an improved polishing performance over either component used alone.

4 Claims, 4 Drawing Sheets

OPTICAL POLISHING FORMULATION

BACKGROUND TO THE INVENTION

The present invention relates to formulations for polishing optical surfaces. The surface polished can be glass or plastic.

It is well known that in order to produce a satisfactory optical surface, it is necessary that the surface be free of scratches and have as low an $R_a$ as possible. This $R_a$ measurement is the average distance between the highest and lowest points on the surface perpendicular to the plane of the glass sheet being polished. Thus, accepting that the surface will not be totally flat at the submicron scale, it is a measure of the variation between highest and lowest points. Clearly the lower the figure the better for optical clarity and freedom from distortion.

There is how ever another consideration and that is the speed at which the desired level of optical perfection is reached. Glass polishing is a chemical mechanical process that only proceeds in an aqueous environment. It is necessary for the polishing compound to react with the glass surface and the water, as well as the surface to be subject to abrasion. Some materials such as ceria are quite reactive but not very abrasive. Others such as alumina are quite abrasive but do not have much surface reactivity. This subject is well treated in an article by Lee Clark entitled "Chemical Processes in Glass Polishing" appearing in Journal of Non-Crystalline Solids 120 (1990), 152–171. In an industrial environment, there is a significant advantage in finishing the process in shorter rather than longer times, particularly when no quality sacrifice is required and or where quality can be improved.

In polishing processes there are two approaches. In the first, a slurry of abrasive particles in an aqueous medium, (usually based on deionized water), is placed in contact with the surface to be polished and a pad is caused to move across the surface in predetermined patterns so as to cause the abrasive in the slurry to polish the surface. In the second the abrasive particles are embedded in a resin matrix in the form of a tool and the tool is then used to polish the optical surface. The present invention relates to the first approach in which slurries are used.

Various slurry formulations have been proposed in the art. U.S. Pat. No. 4,576,612 produces its slurry in situ in controlled amounts by providing a pad with a surface layer comprising the abrasive particles in a resin which gradually dissolves during use to liberate the polishing particles. The particles declared to be useful include cerium oxide ("ceria"), zirconium oxide ("zirconia") and iron oxide.

EP 608 730-A1 describes an abrasive slurry for polishing a surface in an optical element which comprises an abrasive selected from alumina, glass, diamond dust, carborundum, tungsten carbide, silicon carbide or boron nitride with particle sizes up to one micron.

U.S. Pat. No. 5,693,239 describes an aqueous slurry for polishing and planarizing a metallic workpiece which comprises submicron particles of alpha alumina together with other softer form of alumina or amorphous silica.

A considerable amount of art also exists in the related field of slurry formulations for chemical mechanical polishing of semiconductor substrates and again, these commonly employ the same abrasives with variations in components of the dispersion medium.

Success in polishing glasses is of course to some extent dependent on the hardness of the glass. With very hard glasses polishing can take a very long time indeed and raises finish problems if the obvious expedient of using a harder abrasive is tried.

The slurry formulations of the prior art are often very effective at achieving the desired result. However they also take quite a long time. A novel formulation has been developed, where two oxides, "alumina and ceria", work together in synergy, such that their mutual interaction gives better results than the sum of any single component effects. This formulation permits a very high level of optical perfection to be achieved in a much shorter time than is attainable with such prior art slurries without the need for the elevated temperatures sometimes used to enhance reactivity. In addition they polish even hard glasses very effectively with little or no collateral damage to the surface. They can be used with "pad" or "pitch" type polishing apparatus.

GENERAL DESCRIPTION OF THE INVENTION

The present invention provides an optical polishing formulation which comprises a dispersion medium with abrasive particles dispersed therein wherein the abrasive comprises alpha alumina and ceria particles in an alumina to ceria ratio of from 95:5 to 85:15 and more preferably from 96:4 to 88:12.

In preferred formulations the alumina is in the form of particles that are essentially completely submicron in size and wherein the mean particle size is less than 0.5 micron and most preferably from 0.15 to 0.25 micron. In the context of this Application, it is understood that the "mean particle sizes" discussed are the "$D_{50}$" values measured using an L-910 particle size analyzer sold by Horiba Ltd. Such aluminas are obtainable for example using the process described in U.S. Pat. No. 4,657,754.

Commercially available ceria is generally a mixture of rare earth metal oxides with ceria as the largest component. Other components can include neodymia, samaria, praeseodymia and lanthana. Other more minor amounts of the other rare earths may also be present. In practice it is found that the purity of the "ceria" does not greatly affect the performance of the abrasive particles in the polishing application so that the property found useful in this invention would appear to be shared to a greater or lesser extent by all the other rare earth metal oxides that appear with ceria in commercial materials sold under that name. For the purposes of this description, rare earth metal oxides mixtures in which ceria is the dominant component in terms of weight percentage in the product, will be referred to as "ceria". Examples of commercial sources of "ceria" include "50D1" and "SUPEROX® 50" (both available from Cercoa PenYan N.Y.) which contains about 75% and 34% ceria respectively; and "RHODOX® 76" (from Rhone Poulenc) comprises about 50% of ceria.

As commercially available, ceria is usually in the form of particles with bicomponent particle size distribution with peaks around particle sizes of 0.4 and 4 microns, with the larger size providing the bulk of the particles. This gives an overall $D_{50}$ value for the powder of less than 4, and usually from 3–3.5 microns. It is found that if this distribution is reduced by milling the ceria to a relatively uniform particle size around 0.2 micron and more preferably around 0.4 micron, the performance of the formulation is not greatly affected unless the glass is particularly hard and a high level of visual perfection is also required. In these circumstances the unground particle size distribution is often found to be more effective.

The medium in which the abrasive particles is dispersed is aqueous though minor amounts of water-miscible liquids such as alcohols can be present. Most commonly deionized water is used along with a surfactant to assist in keeping the abrasive particles well dispersed. The solids content of the slurry is typically from 5 to 15 or even 20% by weight, lower or more dilute percentages for pitch. Generally a slurry with a lower solids content will polish more slowly and a slurry with a high solids content may have a problem with the abrasive settling out of the slurry. Practical considerations therefore dictate a solids content of from 5. to 15 and more preferably from 8 to 12% by weight of solids in the slurry.

DESCRIPTION OF PREFERRED EMBODIMENTS

The invention is now further described with reference to the following examples which are intended to demonstrate the utility of the invention and the effects of varying the purity and particle size of the ceria component. The examples are not however intended to imply any necessary limitations on the scope of the invention.

EXAMPLE 1

In this Example the performance of the abrasive mixture of the invention is compared against slurry formulations containing the components alone.

The polishing tests were performed on a double-sided AC500 polishing machine from Peter Wolters Company equipped with "SUBA® 500" polishing pads available from Rodel, Inc. The glass samples polished were made from fused silica quartz (Corning), considered a fairly hard glass (560–640 Knoop).

The samples were polished using a 10% solids slurry of each of three abrasives. The first was 100% alumina, the second 100% ceria and the third was a 90:10 mixture of the same alumina and ceria components. The alumina was obtained from Saint-Gobain Industrial Ceramics, Inc. and comprised alpha alumina particles with sizes between about 20 to 50 nanometers in the form of agglomerates about 0.15 to 0.25 micron in diameter. Essentially no agglomerates were larger than a micron. The ceria component was RHODOX® 76, a rare earth metal oxide product comprising about 50% of ceria which had been ground to a particle size with a $D_{50}$ of about 0.4 micron. The slurries were made up in deionized water to which 0.07% by weight of a surfactant, (sodium polyacrylate available from R. T. Vanderbilt under the trade name mark DARVAN® 811), had been added.

The performance in terms of the surface finish obtained was tracked with time and a graph was drawn of the data collected. This appears as FIG. 1 of the drawings. FIG. 2 shows the same data with an expanded "Finish" axis to show the improvement obtained more clearly.

Figure 1:
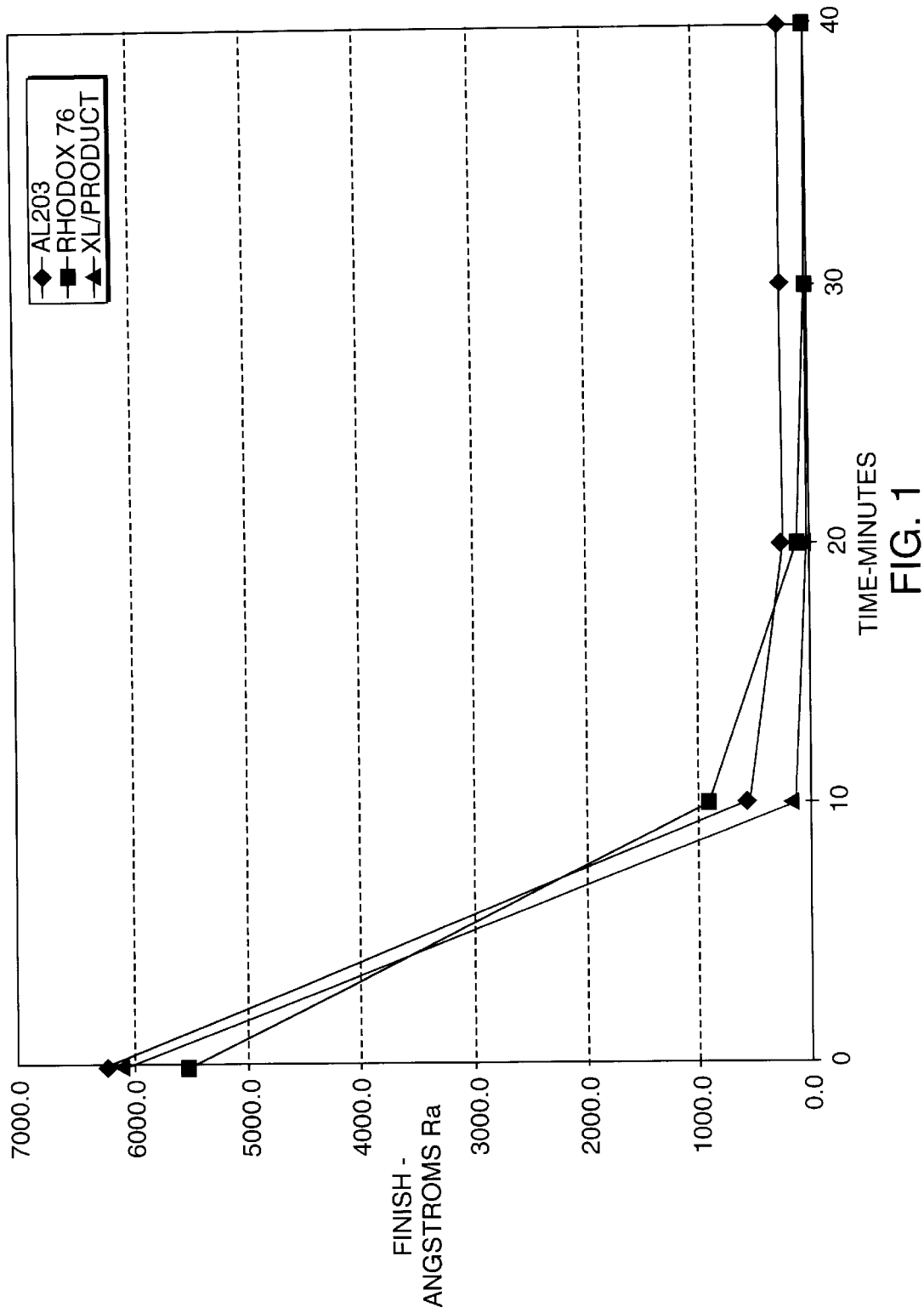
FIG. 1 is a graph showing the change in the "Finish" ($R_a$) with Time for the formulations described in Example 1.
Figure 2:
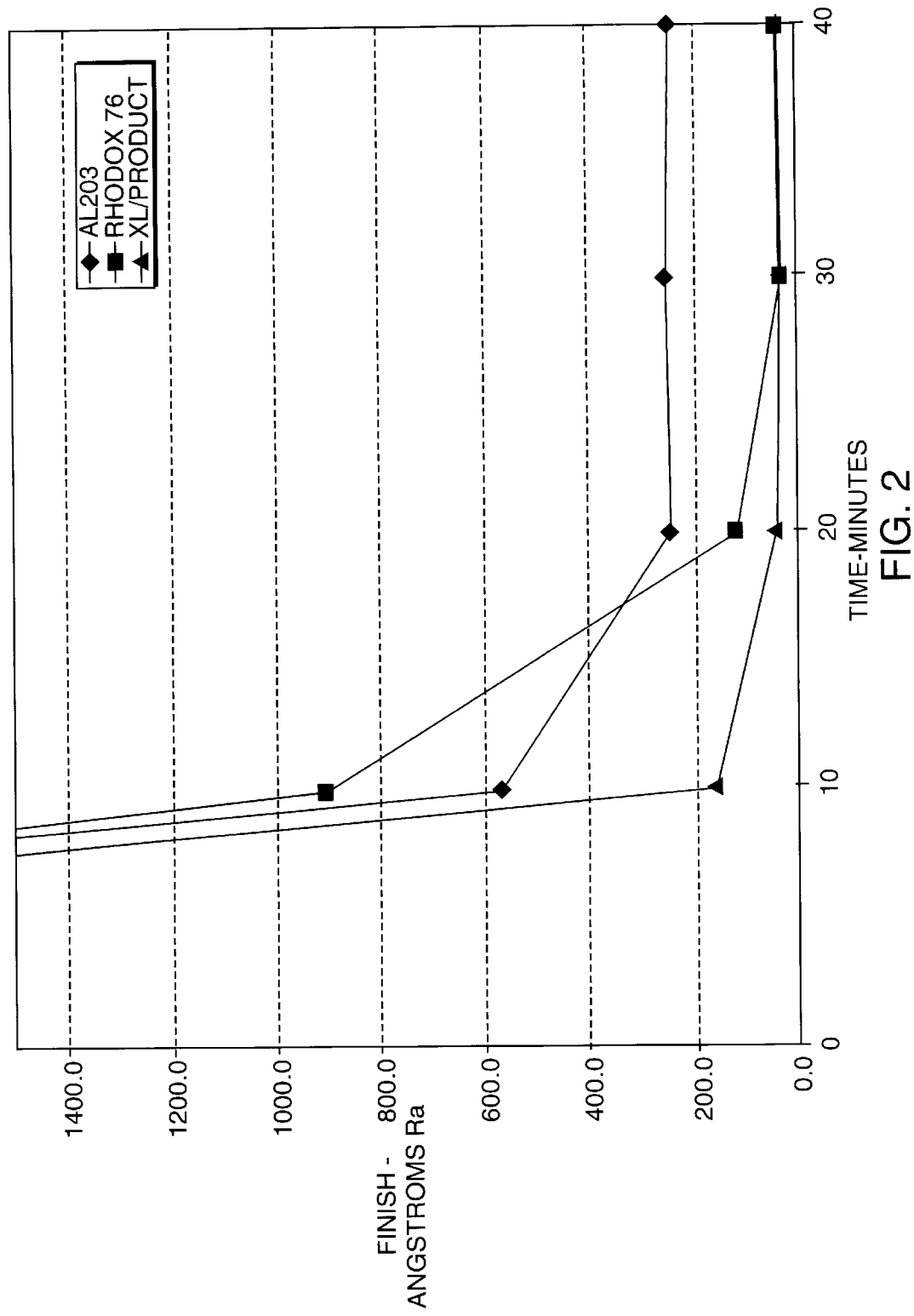
FIG. 2 shows a portion of the same information presented in FIG. 1 in enlarged form.

From FIGS. 1 and 2 it can be seen that, although the sample polished with 100% ceria had a better initial finish, (that is, before polishing it was smoother), than the other two, it did not polish nearly so well. As can be seen from FIG. 2, the alumina alone never reached a surface finish, ($R_a$), of 200 angstroms. On the other hand this surface finish level was reached by the ceria after about 19 minutes and the mixture according to the invention reached this level in less than 10 minutes. Viewed from a different angle, after about 10 minutes the ceria-slurry polished material had a surface finish of about 900, alumina-slurry polished material had a finish of a little less than 600 and the slurry according to the invention produced a finish of less than 200.

EXAMPLE 2

This Example explores the effect of varying the particle size of the ceria in the polishing of fused silica.

Figure 3:
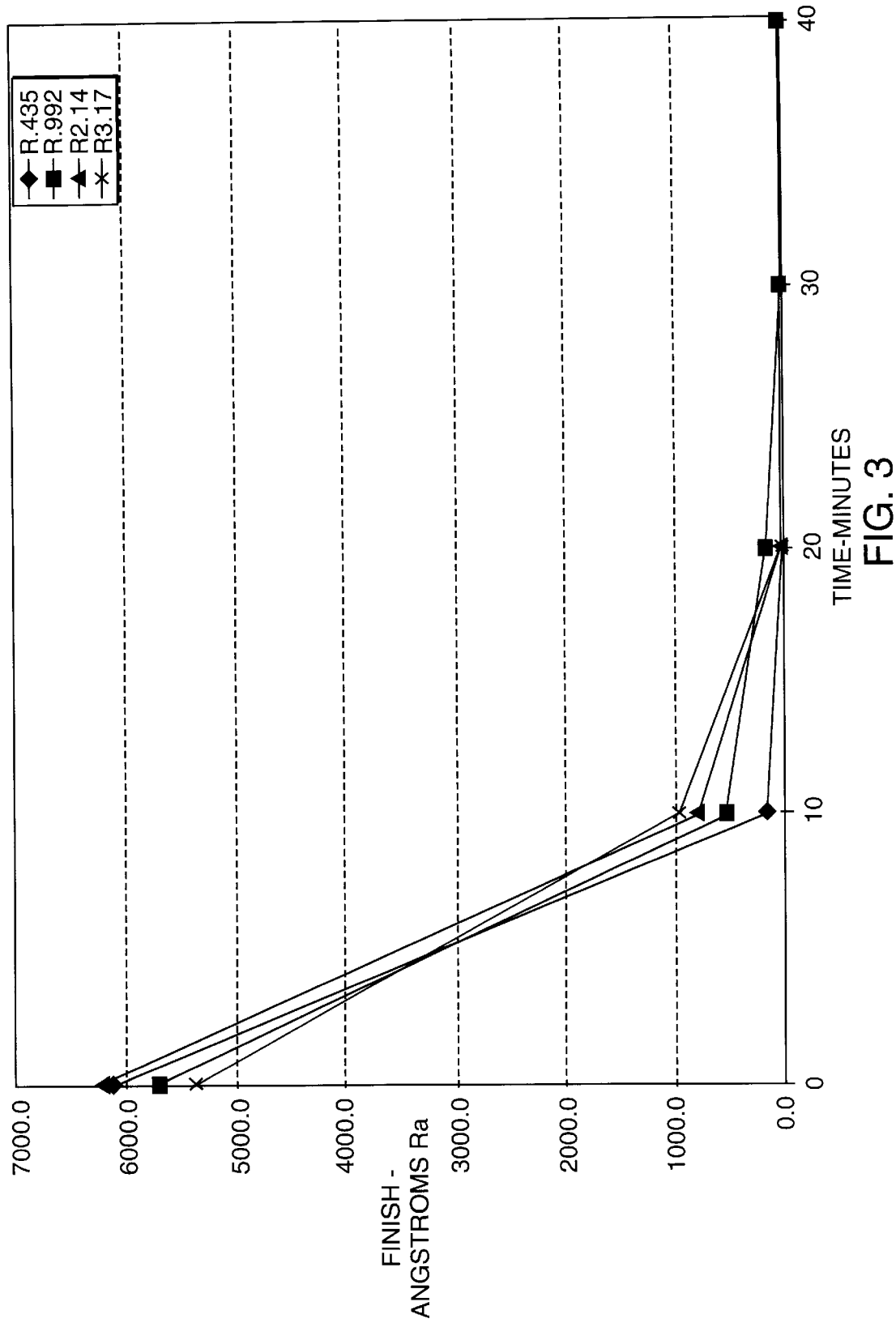
FIG. 3 is a graph similar to that shown in FIG. 1 but recording the data generated in Example 2.

The formulation according to the Invention was essentially that used in Example 1 with the ceria being RHODOX® 76 obtained from Rhone Poulenc. The RHODOX® 76 was however used in four different particle sizes (as measured by the $D_{50}$ value determined using an L-910 particle size analyzer sold by Horiba Ltd in four separate polishing evaluations. The particle sizes used were 3.17 microns, 2.14 microns, 0.992 microns and 0.435 microns. The graph presented as FIG. 3 summarizes the results. From that graph it will be appreciated that, with this glass, there was little difference in the polishing performance that could be traced to the effect of the ceria particle size. Similar results were obtained using "SUPEROX® 50" and "50D-1" as the ceria sources.

EXAMPLE 3

Figure 4:
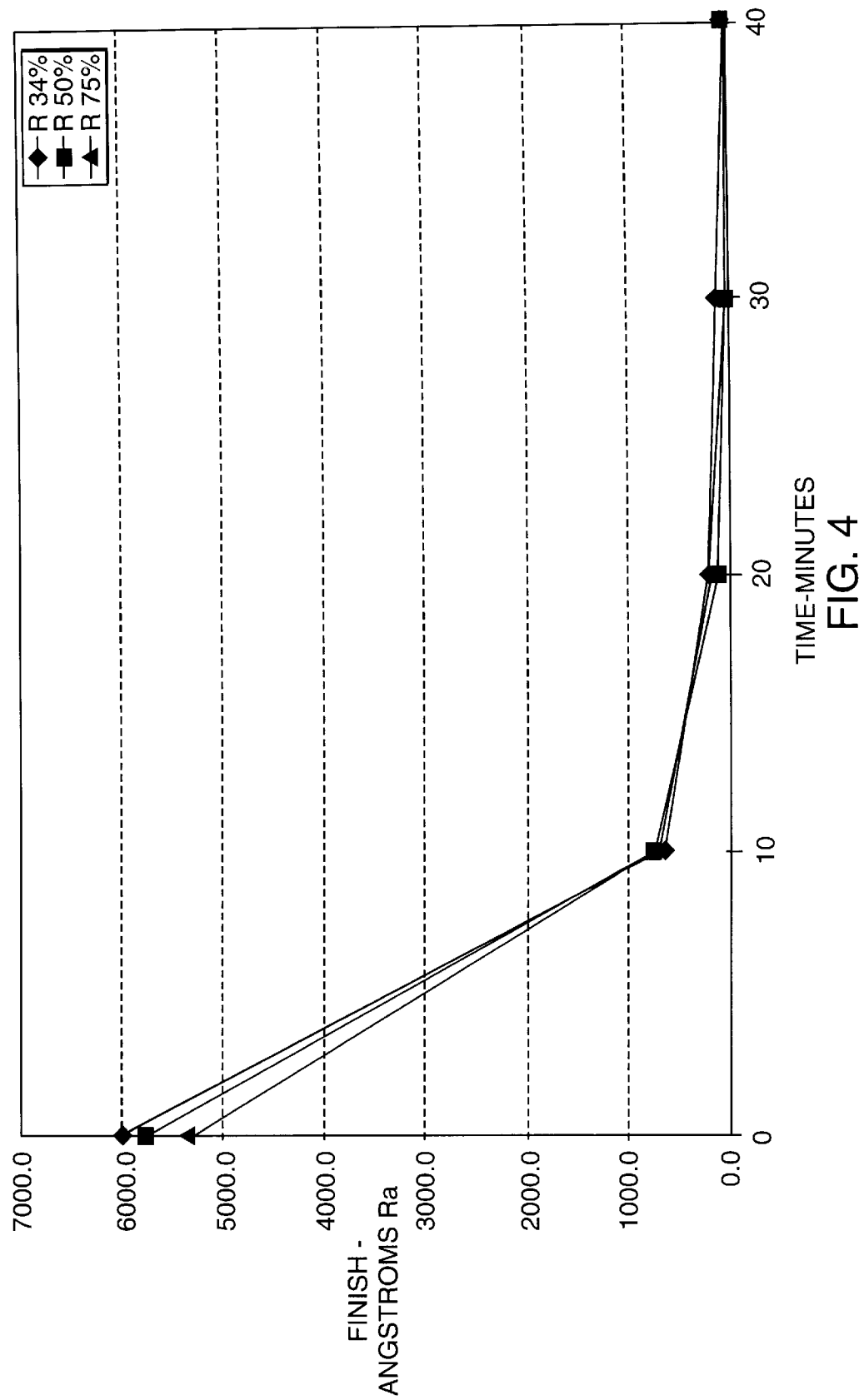
FIG. 4 is a graph similar to that shown in FIG. 1 but recording the data generated in Example 3.

In this Example the source of the ceria was investigated and specifically whether the purity of the product had any effect on the polishing efficiency. Formulations according to the invention were made up containing about 10% of the ceria component and correspondingly about 90% of the alumina used in the Example 1 formulations. These formulations were tested polishing fused silica glass using equipment and procedures identical to those described in Example 1. The results displayed in FIG. 4 were obtained. The first sample, "S", was "SUPEROX® 50" which contains about 34% of ceria. The second, "R", was "RHODOX® 76" which contains about 50% ceria. The third, "D", was "50D1" which contains about 75% ceria. As will be observed, little difference in polishing performance was seen between the three. It would appear then that the other rare earth metal oxides probably behave in a similar fashion to ceria in the formulations according to the invention.

EXAMPLE 4

This Example investigates the polishing efficiency and effects of ceria particle size on B270 glass, (hard glass 530 Knoop). Whereas the above Examples were evaluated under laboratory conditions and tested only for "Surface Finish" measured in terms of the $R_a$ value, the following evaluations were made in a production facility using a skilled operator who evaluated the end point in terms of visual perfection. This means more than just the $R_a$ value which does not necessarily identify "grayness" resulting from surface imperfections left by the polishing operation.

A 4800 P. R. Hoffman double sided polisher equipped with "Suba 10" polishing pads obtained from Rodel corporation was used. A pressure of approximately 1.5 psi, ($1.034 \times 10^4$ pascals), was applied to the pieces during polishing. The end point of the polishing was when a desired predetermined level of surface perfection (clarity) had been reached.

Three formulations according to the invention were made up. All three contained the alumina and surfactant components described in Example 1 in the same amounts and dispersed, along with the ceria component, in the same relative proportions in deionized water. The difference between the components lay in the particle size of the ceria. In the first, ("Formulation A"), the ceria component had been ground down to a $D_{50}$ of 0.4 micron. In the second and third, ("Formulations B and B"), the ceria (SUPEROX® 50) was used as supplied directly by the manufacturer. The only difference between the two was the glass samples being polished. In the second, "B", the size of the samples being polished was smaller, and therefore the pressure exerted on them during polishing in the same machine, was greater. This resulted in the achievement of the end point more quickly. In the fourth, "Formulation C", the ceria (Rhodox 76) was also used as supplied by the manufacturer. As indicated earlier, the as received materials had a bimodal distributions with the larger volume of particles having a particle peak on an L-910 particle size analyzer sold by Horiba Ltd around 4. The results are set forth in Table 1 below.

TABLE 1

| FORMULATION | # PIECES | START THICKNESS | END THICKNESS | TIME (minutes) |
| --- | --- | --- | --- | --- |
| A | 24 | 4.180 mm | 4.168 mm | 120 |
| B | 10 | 4.186 mm | 4.155 mm | 60 |
| B' | 20 | 4.183 mm | 4.163 mm | 40 |
| C | 10 | 4.180 mm | 4.150 mm | 50 |

Formulation A, (which used the ground ceria component, produced a uniform light grey color after 90 minutes and required a further 30 minutes to remove this grayness and leave a flatness below one tenth of a wavelength. Formulations B and B' polished very aggressively and consistently uniform across the workpiece. Formulation C also polished extremely well and swiftly. The B270 glass product had an excellent surface flatness. Other polishing materials can polish "spottily" rather than consistently and uniformly over the workpiece surface, as with these formulations.

It would appear therefore that, where clarity is critical, polishing with formulations having an unground ceria component provides significant advantages. Conversely formulations having ground ceria components grind quickly and to flatness quickly, but take longer to reach visual perfection.

What is claimed is:

1. An optical polishing formulation comprising an aqueous slurry containing from 5 to 20% by weight of solids in which from 85–95% of the solids content is provided by an alpha alumina component with a mean particle size less than 0.5 micron, and from 15 to 5% by weight of the solids content is provided by ceria in the form of a powder with a mean particle size from 0.2 to 4 microns.

2. An optical polishing formulation according to claim 1 in which the solids content of the slurry is from 8 to 12% by weight.

3. An optical polishing formulation according to claim 1 in which the alumina component has a mean particle size of from 0.15 to 0.25 micron.

4. An optical polishing formulation according to claim 1 in which the ceria component is in the form of particles with a bicomponent particle size distribution and a mean particle size of 3 to 4 microns.

* * * * *